US008919851B2

(12) United States Patent
Maier et al.

(10) Patent No.: US 8,919,851 B2
(45) Date of Patent: Dec. 30, 2014

(54) RESTRAINT DEVICE FOR A VEHICLE INTERIOR

(71) Applicants: Matthias Maier, Esslingen (DE); Huan Tran, Ostfildern (DE); Wolfgang Schaller, Denkendorf (DE); Herbert Walter, Ebersbach (DE)

(72) Inventors: Matthias Maier, Esslingen (DE); Huan Tran, Ostfildern (DE); Wolfgang Schaller, Denkendorf (DE); Herbert Walter, Ebersbach (DE)

(73) Assignee: Bos GmbH & Co. KG, Ostfildern (DE)

( * ) Notice: Subject to any disclaimer, the term of this patent is extended or adjusted under 35 U.S.C. 154(b) by 0 days.

(21) Appl. No.: 14/089,926

(22) Filed: Nov. 26, 2013

(65) Prior Publication Data

US 2014/0145464 A1 May 29, 2014

(30) Foreign Application Priority Data

Nov. 26, 2012 (DE) .......................... 10 2012 221 585

(51) Int. Cl.
*B60R 21/06* (2006.01)
(52) U.S. Cl.
CPC ...................................... *B60R 21/06* (2013.01)
USPC ....................................................... 296/24.43
(58) Field of Classification Search
USPC ............ 296/24.43; 160/370.22; 280/748, 749
See application file for complete search history.

(56) References Cited

U.S. PATENT DOCUMENTS

| 6,216,762 | B1 | 4/2001 | Lin |
| 6,325,436 | B1 * | 12/2001 | Ehrenberger et al. ......... 296/24.4 |
| 7,017,965 | B2 * | 3/2006 | Sitzler et al. ................ 296/24.43 |
| 7,207,613 | B2 * | 4/2007 | Walter et al. .................. 296/24.4 |
| 7,213,856 | B2 * | 5/2007 | Katada ........................ 296/24.43 |

FOREIGN PATENT DOCUMENTS

DE 103 48 890 A1 5/2005
DE 10 2006 017 627 A1 10/2007

OTHER PUBLICATIONS

Machine Translation of DE 102006017627 Sep. 30, 2014.*

* cited by examiner

*Primary Examiner* — Hilary Gutman
(74) *Attorney, Agent, or Firm* — Flynn, Thiel, Boutell & Tanis, P.C.

(57) ABSTRACT

A restraint device for a vehicle interior has a flexible planar structure movably mounted between a rest position and an extended function position and that is provided at its end area with a dimensionally stable pulling-out section, and the restraint device has at least one roof-side holder in which the pulling-out section is detachably fixed by at least one complementary securing section in the extended function position of the planar structure. The roof-side holder includes a receptacle and a stationary locking pawl arrangement mechanically matched to a movement distance of the at least one securing section during transfer from the rest position to the function position. The securing section during its upward travel presses the locking pawl arrangement into the release position, and the securing section enters the receptacle and the locking pawl arrangement automatically moves back into its locking position as soon as the securing section has entered the receptacle.

18 Claims, 3 Drawing Sheets

RESTRAINT DEVICE FOR A VEHICLE INTERIOR

CROSS-REFERENCE TO RELATED APPLICATION

This application claims the priority of the German patent application DE 10 2012 221 585.9, the disclosure of which is hereby incorporated into this application.

FIELD OF THE INVENTION

The invention relates to a restraint device for a vehicle interior having a flexible planar structure that is movably mounted between a rest position stowed in the area of a vehicle-fixed supporting structure and a function position extended approximately vertically towards a roof area and that is provided at its end area in front in the extension direction with a dimensionally stable pulling-out section, and having at least one roof-side holder in which the pulling-out section is detachably fixed by at least one complementary securing section in the extended function position of the planar structure.

BACKGROUND OF THE INVENTION

A restraint device of this type is known from DE 10 2006 017 627 B4. The known restraint device has as its flexible planar structure a partition net which is held windably and unwindably in a cassette housing on a winding shaft. The winding shaft is rotatably mounted inside the cassette housing. The cassette housing extends in the assembled operating state over the width of a luggage compartment in the vehicle transverse direction and is arranged fixed to the vehicle behind a backrest arrangement of a bench-type rear seat. The partition net has at its end area in front in the pulling-out direction a dimensionally stable pulling-out section provided at opposite ends with securing sections which comprise mushroom-shaped suspension hooks. The pulling-out section can be fixed in the extended function position of the partition net in roof-side holders by its opposite securing sections. A lifting unit is provided to pull the pulling-out section and the partition net upwards from the rest position stowed in the cassette housing and to transfer it into the extended function position in which the securing sections of the pulling-out section are fixed in the roof-side holders. The lifting unit is also intended to return the pulling-out section and the partition net from the extended function position back into the rest position stowed in the cassette housing.

The object of the invention is to provide a restraint device of the type mentioned at the outset that has a structure simplified in comparison with the prior art.

This object is achieved in that the at least one roof-side holder comprises a stationary receptacle and a locking pawl arrangement which is mechanically matched to a movement distance of the at least one securing section during transfer from the rest position to the function position in such a way that during its upward travel the securing section presses the locking pawl arrangement into the release position, the securing section enters the receptacle and the locking pawl arrangement automatically moves back into its locking position as soon as the securing section has entered the receptacle. The solution in accordance with the invention can operate purely mechanically, without the need for drive units that have to be operated with electric, pneumatic or hydraulic energy sources. The automatic return movement of the locking pawl arrangement from a release position to the locking position is achieved either by gravity or by mechanical spring loading, which presses the locking pawl arrangement back into the locking position after forcing past the securing section of the pulling-out section. The locking pawl arrangement is preferably swivelably mounted, but can also be guided in linear-movable manner. To automatically move the locking pawl arrangement in the direction of its release position during an upward lifting movement of the securing section of the pulling-out section, corresponding forcible guidance surfaces in the form of angled contact surfaces or the like are provided in the area of the locking pawl arrangement and/or in the area of the securing section and in the event of mechanical contact of the securing section with the locking pawl arrangement press the latter aside. The result is a dependable function for locking of the at least one securing section in the at least one roof-side holder, which maintains the locked function position regardless of any failure of drive sources, such as in particular failure of the electrical system.

In an embodiment of the invention, two roof-side holders are provided spaced apart from one another in the vehicle transverse direction and each have a securing section of the pulling-out section assigned to them. The term "roof-side holders" covers all holders positioned in or near a roof area of the vehicle interior. The term "roof-side holders" is intended to encompass in particular holders which are arranged fixed to the vehicle in its interior in such a way that when pulling-out sections are anchored in the roof-side holders, the flexible planar structure is in its extended function position, in which it separates a luggage compartment from a passenger area inside the vehicle interior. A segmenting device which separates one partial area of a luggage compartment from another partial area can also be provided as a restraint device for a luggage compartment. Here too the flexible planar structure is—as is the case in luggage compartment separation from the passenger area—extended approximately vertically in the vehicle vertical direction and detachably fixed in the extended function position in holders which are closer to a roof-side or floor-side limiting surface of the vehicle interior than a supporting structure in which the flexible planar structure is received in its stowed rest position. It is also possible in accordance with the invention to arrange a corresponding supporting structure in a roof area of the vehicle interior and to pull out the flexible planar structure from above and approximately vertically downwards in order to detachably fix it in corresponding holders. In this case, holders on the inner side and assigned to an opposite floor-side limiting surface of the vehicle interior are also covered by the term "roof-side holders".

In a further embodiment of the invention, a lifting mechanism is provided which is assigned a drive unit for moving the lifting mechanism upwards out of a lower parked position in the area of the supporting structure. The lifting mechanism is used to transfer the pulling-out section and the flexible planar structure from the rest position stowed in the area of the supporting structure to the extended function position and to insert the pulling-out section with its securing sections into the roof-side holders. After the automatic locking of the securing sections by the locking pawl arrangement in the area of each roof-side holder, the lifting mechanism can be lowered back into its lower parked position in the area of the supporting structure.

In a further embodiment of the invention, the lifting mechanism comprises at least one lifting arm arrangement and one lifting section supported by the lifting arm arrangement and comprising drivers to pick up and lift the pulling-out section. The lifting section is held approximately parallel over a lifting distance of the lifting mechanism, so that the pulling-out section of the flexible planar structure picked up by the lifting section is also transferred upwards and substantially parallel to the function position. This ensures that the pulling-out section with its opposite securing sections enters both roof-side holders at the same time.

In a further embodiment of the invention, means are provided for releasing the locking position of the locking pawl arrangement. This releases a lower opening of each receptacle of each roof-side holder, so that the securing sections of the pulling-out section automatically slide downwards out of the receptacles of the roof-side holders under their dead weight. A winding shaft rotatably mounted in the supporting structure can be subjected to torque in the winding direction by a return spring and wind on the flexible planar structure under spring force as soon as the securing sections in the area of the roof-side holders are released. Instead of a simple dropping out of the pulling-out section due to gravity, the lifting mechanism can also assist the unlocking and lowering operation of the pulling-out section. To do so, the lifting section of the lifting mechanism picks up the pulling-out section in its extended function position inside the roof-side holders from underneath and presses the pulling-out section further upwards in order to end the contact between the securing sections of the pulling-out section and the locking pawl arrangements, and thereby release the locking pawl arrangements for swiveling them into the release position. Then the lifting mechanism including its lifting section can be lowered in simple manner, with the pulling-out section supported by the lifting section also being automatically lowered.

In a further embodiment of the invention, the locking pawl arrangement is assigned a sensor unit, which detects a contact of the securing section of the pulling-out section with the locking pawl arrangement in the locked securing position of the pulling-out section and which is connected to a control unit for operating the locking pawl arrangement for an unlocking operation. This ensures that the locking pawl arrangement is transferred from the locking position to the unlocked position, i.e. the release position, as soon as the respective securing section of the pulling-out section is lifted off the locking pawl arrangement.

In a further embodiment of the invention, each locking pawl arrangement is assigned a drive element for transferring the locking pawl arrangement from the locking position to the release position, which element can be actuated by the control unit. The drive element is preferably an electric drive motor. A pneumatic or hydraulic element can also be provided as the drive element. The drive element is used exclusively for transferring the locking pawl arrangement, in the locked state of the corresponding securing section of the pulling-out section, from the locking position to the release position. As long as no securing section of the pulling-out section is received in the receptacle of the respective roof-side holder, the drive element is not operative. This is because for a transfer of the locking pawl arrangement during movement of the pulling-out section from below in order to transfer the planar structure from the rest position to the extended function position, the locking pawl arrangement is opened mechanically by the securing section making contact from below.

In a further embodiment of the invention, the control unit is connected to the drive unit for the lifting mechanism in order to lift the lifting mechanism out of the parked position and move it upwards. The control unit can also be provided to actuate the drive unit of the lifting mechanism in order to raise the pulling-out section in the locked function position inside the roof-side holders and to subsequently lower it in the direction of the rest position stowed in the area of the supporting structure.

In a further embodiment of the invention, the lifting mechanism is mounted on the supporting structure, and sensor means connected to the control unit are provided for detection of a vehicle-fixed operating position of the supporting structure. The detection of vehicle-fixed anchoring of the supporting structure ensures that the supporting structure is fastened in crash-proof manner inside the vehicle interior before the flexible planar structure is transferred to its extended function position.

In a further embodiment of the invention, the control unit operates the drive unit for the lifting mechanism depending on the recorded signals of the sensor means relating to the operating position of the supporting structure. As soon as the control unit has detected that the supporting structure is anchored in crash-proof manner in the vehicle interior, the flexible planar structure can be transferred to its function position or then moved back from the function position to the rest position.

BRIEF DESCRIPTION OF THE DRAWINGS

Further advantages and features of the invention can be found in the claims and in the following description of a preferred embodiment of the invention, which is illustrated by the drawings. They show in:

DETAILED DESCRIPTION

Figure 1:
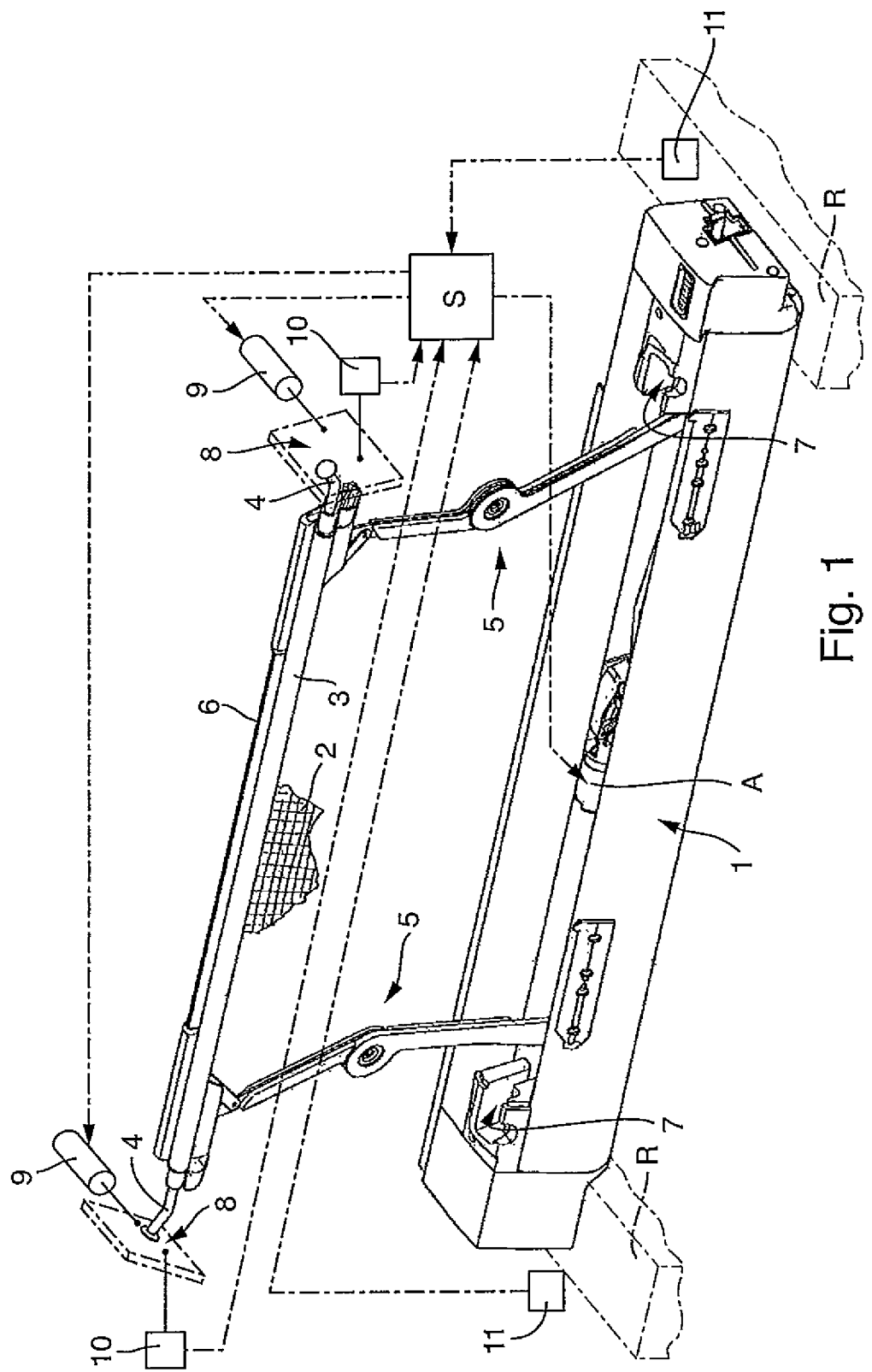
FIG. 1 an embodiment of a restraint device in accordance with the invention in a partially schematic view, FIG. 2 a roof-side holder of the restraint device according to FIG. 1 in a first position in an enlarged view, FIG. 3 the roof-side holder according to FIG. 2 in a second position, FIG. 4 the roof-side holder according to FIGS. 2 and 3 in a third position, FIG. 5 the roof-side holder according to FIGS. 2 to 4 in a locked limit position of a securing section of a pulling-out section of the restraint device according to FIG. 1, FIG. 6 the roof-side holder in a view of a rear side which is opposite the front view according to FIGS. 2 to 5, and FIG. 7 an isometric view of the roof-side holder according to FIG. 6.

A restraint device according to FIGS. 1 to 7 has a cassette housing 1 which is fixed to the vehicle in an operating position inside a vehicle interior. To do so, the cassette housing 1, forming a supporting structure in the meaning of the invention inside a luggage compartment of the vehicle interior, extends in the vehicle transverse direction and is anchored in crash-proof manner and fixed to the vehicle in the area of opposite side rails R of the luggage compartment. The crash-proof fastening of the cassette housing 1 is designed detachable to allow the cassette housing 1 to be removed if not required or for positioning elsewhere in the vehicle interior.

Inside the cassette housing 1, a winding shaft is rotatably mounted in a manner not shown in detail, on which shaft a flexible planar structure in the form of a partition net 2 is windably and unwindably held. The partition net 2 is movably mounted between a rest position stowed inside the cassette housing 1, in which the partition net 2 is wound onto the winding shaft, and a function position extended approximately vertically upwards, in which the partition net 2 in the position as shown of the cassette housing 1 separates the luggage compartment above the backrest arrangement of the bench-type rear seat from the front passenger area. The luggage compartment is provided in a rear area of the motor vehicle. The restraint device according to FIGS. 1 to 7 is in particular arranged in the vehicle interior of passenger cars.

The partition net 2 has at its end area in front in the pulling-out direction a dimensionally stable pulling-out section 3 extending transversely to the pulling-out direction of the partition net 2. The pulling-out section 3 has at each of its opposite ends a securing section 4 which is designed as an outward-projecting longitudinal profile section. Each securing section 4 is detachably fixed in a roof-side holder 8 in the extended function position of the partition net 2. The roof-side holders 8 are fastened opposite one another to roof frame areas of a bodywork supporting structure of the vehicle interior in order to permit crash-proof anchoring for the pulling-out section 3. The opposite roof-side holders 8 are opposite to one another parallel to a rotary axis of the winding shaft and hence parallel to a longitudinal axis of the cassette housing 1, so that the pulling-out section 3 is anchored in the roof-side holders 8 in the extended function position of the partition net 2 in such a way that a longitudinal axis of the pulling-out section 3 is aligned at least substantially parallel to the rotary axis of the winding shaft and to a longitudinal axis of the cassette housing 1.

To transfer the pulling-out section 3 and the partition net 2 from the rest position stowed in the cassette housing 1 to an extended function position, and to insert the pulling-out section 3 with its opposite securing sections 4 into the roof-side holders 8, the pulling-out section 3 is, in the embodiment according to FIGS. 1 to 7, assigned a lifting mechanism 5, 6 which is positively connectable to the pulling-out section 3 in order to raise or lower the pulling-out section 3. The lifting mechanism 5, 6 has two lifting arm arrangements 5 which are supported and mounted at a distance from one another inside the cassette housing. The two lifting arm arrangements 5 are moved by a central drive unit A in synchronized manner between a parked position stowed in the cassette housing 1 and an upward-extending function position, said drive unit comprising an electric drive motor. The two lifting arm arrangements 5 support a lifting section 6 which is part of the lifting mechanism. The lifting section 6 is hinge-connected to the two lifting arm arrangements 5 using mechanical synchronizing means in such a way that the lifting section 6 is moved parallel from its parked position stowed in the area of the cassette housing 1, in which position the lifting section 6 enters receptacles 7 on the housing side, to the extended function position. By doing so, the lifting section 6 is kept parallel to a longitudinal axis of the cassette housing 1 over its entire upward and downward travel. The lifting section 6 has at each opposite side area a receiving web that projects obliquely outwards and upwards. The pulling-out section 3 is received in the area of these two receiving webs, where the pulling-out section 3 rests with its opposite end areas on these receiving webs.

Each roof-side holder 8 has a dimensionally stable housing 12, which in the fitted state is fastened to the bodywork supporting structure in crash-proof manner. The housing 12 has a receptacle 16 open towards the bottom in the vehicle vertical direction and which receptacle is entered by the respective securing section 4 of the pulling-out section 3 so that it can be locked in the corresponding roof-side holder 8. The receptacle 16 is designed slot-like and has a free cross-section matched to a cross-section of the securing section 4 in such a way that the securing section 4 is forcibly guided with only minor lateral clearance for a sliding movement in the vertical direction inside the receptacle 16 as soon as the securing section 4 enters the receptacle 16. Each securing section 4 has at its end a thickened portion widening radially relative to the longitudinal direction of the securing section, which thickened portion is designed mushroom-shaped in the embodiment shown. The mushroom-shaped thickened portion prevents the securing section 4 from sliding axially out of the receptacle 16 transversely to the longitudinal extent of the receptacle 16 and hence substantially in the vehicle transverse direction.

To allow a positive grip behind the securing section 4 when it has entered the receptacle 16 of the housing 12 and accordingly allow it to be locked in this position, a locking pawl arrangement 13 is provided which is rotatably mounted on the housing 12 about a rotary axis $D_1$ at least substantially parallel to the longitudinal axis of the securing section 4. The locking pawl arrangement 13 extends in the locked state of the securing section 4 (FIG. 5) in the vertical direction of the housing 12 and has at a lower area a bar-like locking hook that grips behind the securing section 4. The locking pawl 13 is permanently subjected to a torque in the locking direction by a spring arrangement $F_1$ which is effective coaxially to the rotary axis $D_1$ and is symbolized in FIGS. 2 to 5 by the clockwise-pointing arrow. A leg spring is provided as the spring arrangement $F_1$ in the embodiment shown and exerts the corresponding torque on the locking pawl 13 in the locking direction. At a distance from the rotary axis $D_1$ and substantially opposite the lower locking hook of the locking pawl arrangement 13, the locking pawl arrangement 13 is provided with an approximately vertically upward-projecting lever extension 17 engaged by a Bowden cable 18 of a drive element 9 described in more detail in the following.

A swivel switch 14 is also hinge-connected to the locking pawl arrangement 13 and is swivelably mounted about a rotary axis $D_2$ on the locking hook section of the locking pawl arrangement 13. The rotary axis $D_2$ is aligned parallel to the rotary axis $D_1$. The swivel switch 14 swivelably mounted on the locking pawl arrangement 13 is subjected to torque by a second spring arrangement $F_2$ in the same rotation direction as the locking pawl arrangement 13 by the spring arrangement $F_1$. The swivel switch 14 has a contact tab 15 in one piece with the swivel switch 14, which in the non-loaded rest state of the swivel switch 14 projects into the receptacle 16 when the locking pawl arrangement 13 is in its locked end position (see FIGS. 4 and 5). The swivel switch 14 is assigned a limit switch 10 as the sensor element, which is designed as an electric or electronic sensor element. The limit switch 10 is kept stationary relative to the housing 12. The locking pawl arrangement 13 is also assigned a stop 19 on the housing 12 (FIG. 3) which limits a swivel movement of the locking pawl arrangement 13 in the opening direction and thereby defines a release position for the locking pawl arrangement 13 as the corresponding limit position.

Figure 2:
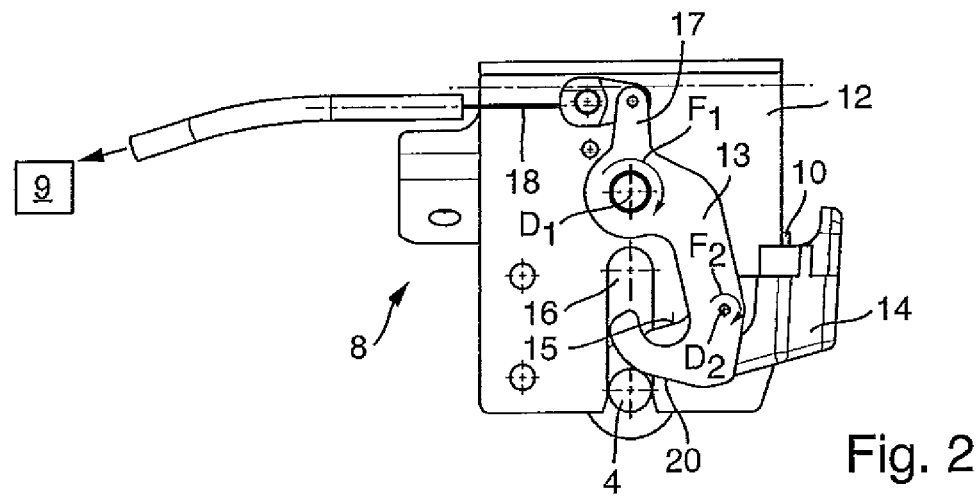
Figure 3:
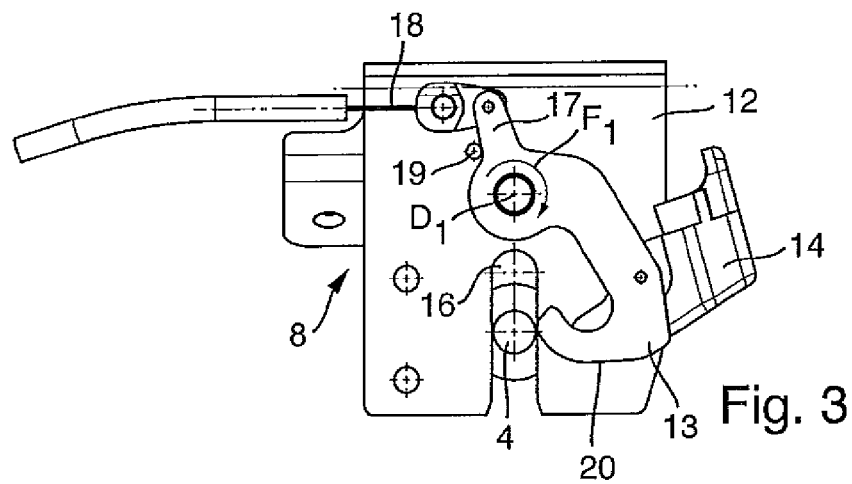

The locking hook section of the locking pawl arrangement 13 has on its lower rim an angled contact surface 20 which—in the locked limit position of the locking pawl arrangement 13 where the latter is held by the spring arrangement $F_1$ due to its preload provided that no external forces are exerted on the locking pawl arrangement 13—is aligned obliquely with the opening of the receptacle 16. The angled contact surface 20 is aligned in such a way that the securing section 4 when entering the receptacle 16 from underneath mechanically contacts the angled contact surface 20 and during its further movement upwards into the receptacle 16 automatically slides along the angled contact surface 20 and in so doing presses outwards the locking pawl arrangement 13 according to FIGS. 2 and 3. As soon as the securing section 4 has entered far enough into the receptacle 16 that the securing section 4 is moved upwards past the locking hook section and the angled contact surface 20 of the locking pawl arrangement 13, the locking pawl arrangement 13 is automatically swiveled by the spring arrangement $F_1$ back into its locking position according to FIG. 4. The still-unloaded swivel switch 14 is in its obliquely aligned rest position, in which it is kept pressed by the spring arrangement $F_2$. The contact tab 15 projects upwards in this position of the swivel switch 14 beyond the locking hook section of the locking pawl arrangement 13 and towards the securing section 4 into the receptacle 16. As soon as the securing section 4 lowers after the removal of the lifting load onto the pulling-out section 3 due to the dead weight of the pulling-out section 3, the securing section 4 contacts the contact tab 15 and presses it downwards until the securing section 4 is resting on the locking hook section of the locking pawl arrangement 13 on the inside. This automatically swivels the contact tab 15 downwards, thereby transferring the swivel switch 14 to its actuating position according to FIG. 5. In this actuating position, a corresponding pushbutton of the limit switch 10 is pressed, since the swivel switch 14 is pressed against the pushbutton of the limit switch 10 (FIG. 5) in the locking position of the securing section 4. The movement of the locking pawl arrangement 13 from the locked position according to FIG. 6 in the direction of the release position according to FIGS. 2 and 3 is exclusively mechanical. The Bowden cable 18 together with the drive element 9 freewheels during this movement.

In the examplary embodiment shown, the drive element 9 is an electric drive motor which can perform a corresponding displacement movement of the Bowden cable 18.

As can be seen from FIG. 1, each roof-side holder 8 is assigned a drive motor 9 and a sensor element in the form of the limit switch 10, all connected to a central control unit S. Also connected to the control unit S are two position sensors 11 which are arranged in the area where the cassette housing 1 is fastened in the side rails 3 and which monitor the safe and crash-proof fastening of the cassette housing 1 in the vehicle interior. The control unit S operates the drive motors 9 and the electric drive motor of the drive unit A for the lifting mechanism 5, 6 depending on corresponding signals from the sensor elements 10 and from the position sensors 11. This operation is such that the drive unit A is not actuated by the control unit S until the position sensors 11 have signaled that the cassette housing 1 is in its securely anchored operating position in the area of the side rails R of the vehicle interior. The lifting mechanism 5, 6 can then move the pulling-out section 3 upwards from the rest position stowed in the cassette housing 1. As soon as the securing sections 4 of the pulling-out section 3 have reached the lower openings of the receptacles 16 in the roof-side holders 8, the securing sections 4 contact the angled contact surfaces 20 of the respective locking pawl arrangement 13 and automatically press the respective locking pawl arrangement 13 mechanically outwards during a further lifting operation of the lifting mechanism 5, 6. The lifting mechanism 5, 6 moves the pulling-out section 3 further upwards until the securing sections 4 contact the upper rim of the receptacle 16 according to FIG. 4. The control unit S detects via suitable sensors the increased resistance to the lifting movement due to the contact of the securing sections 4 with the upper rims of the receptacle 16, and switches off the drive unit A. The lifting mechanism 5, 6 has a freewheel by which the lifting mechanism 5, 6 lowers automatically due to its dead weight. Additionally, the lifting mechanism can be assigned a mechanical return spring which pulls the lifting mechanism downwards in the direction of its parked position. The pulling-out section 3 is therefore released by the lifting section 6, so that the dead weight of the pulling-out section 3 presses the securing sections 4 inside the receptacles 16 downwards. Since the locking pawl arrangement 13 has already automatically moved back into the locking position due to the torque applied by the spring arrangement $F_1$, each securing section 4 contacts the inside of the locking hook section of the respective locking pawl arrangement 13 and is securely locked in the respective roof-side holder 8.

The simultaneous actuation of the limit switch 10 by swiveling of the swivel switch 14 indicates to the control unit S that the locked limit position of the pulling-out section 3 and hence of the securing sections 4 has been reached.

Figure 4:
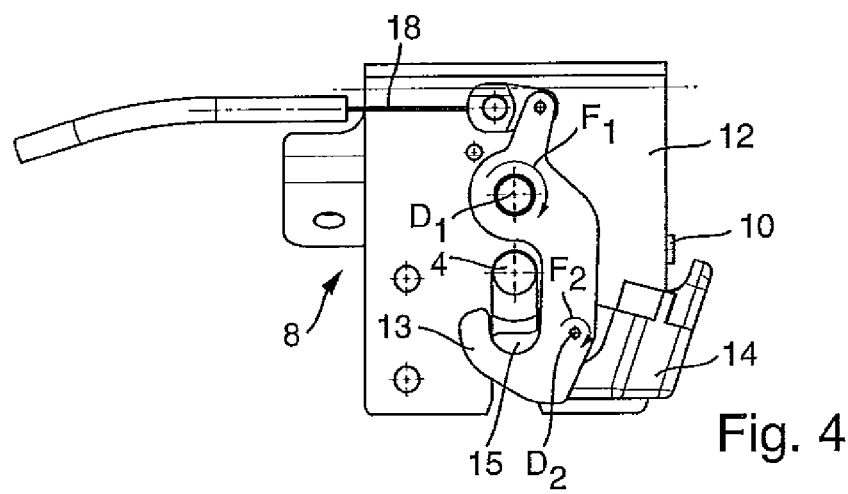
Figure 5:
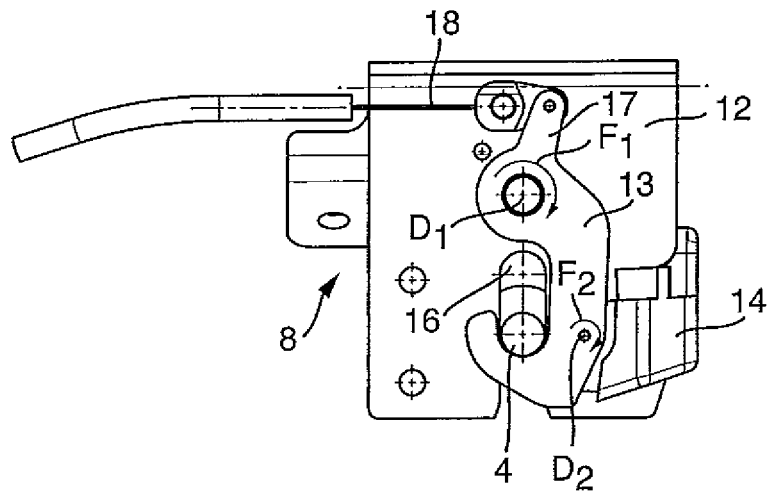
Figure 6:
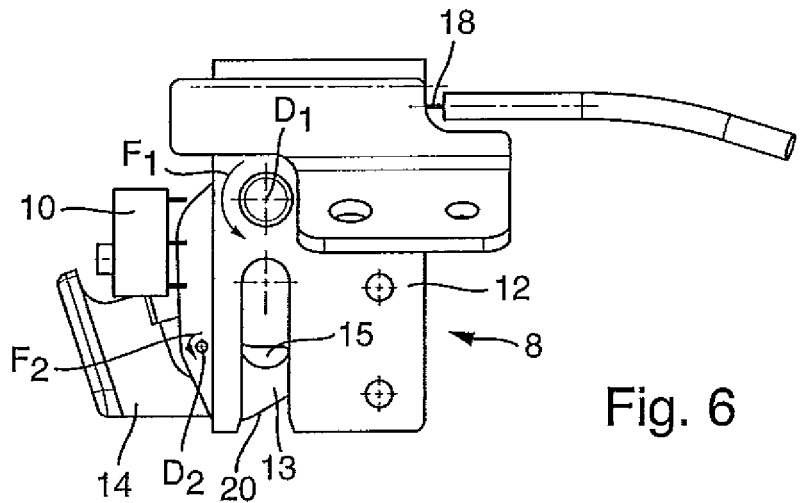
Figure 7:
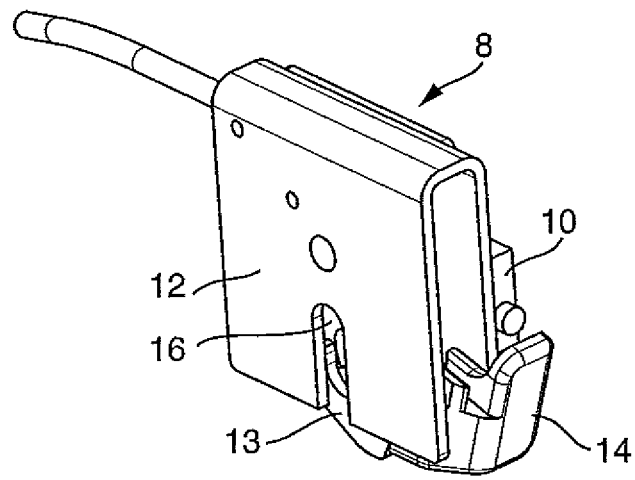

To allow the pulling-out section 3 to be released again from the locked limit position, the pulling-out section 3 is lifted out of the initial position according to FIG. 5 up to the top limit position inside the respective receptacle 16 (FIG. 4). As a result, the swivel switch 14 is automatically swiveled back into its rest position by the spring arrangement $F_2$, so that the pushbutton of the limit switch 10 is released. The respective limit switch 10 indicates to the control unit S that the locking pawl arrangement 13 is free. The control unit S actuates the respective drive element 9, so that the Bowden cable 18 pulls the respective locking pawl arrangement 13 outwards into its release position using the lever extension 17. As a result, the respective securing section 4 of the pulling-out section 3 is released and the pulling-out section 3 can be jointly lowered with the partition net 2. Then the drive element 9 is switched back to free, so that the spring arrangement $F_1$ can mechanically return the locking pawl arrangement 13 to its locking position according to FIG. 6.

The movement of the securing sections 4 out of the roof-side holders 8 is therefore achieved in that first the securing sections are lifted, then the locking pawl arrangements 13 are transferred to their release positions and finally the securing sections 4 can slip downwards out of the receptacles. The lifting and subsequent lowering of the securing sections 4 can be achieved either manually or automatically by the lifting mechanism 5, 6 in that the lifting mechanism is again moved upwards out of its parked position stowed at the cassette housing 1, with the receptacle webs of the lifting section 6 again gripping beneath the pulling-out section 3 in the same way as during the original transfer of the pulling-out section 3 from the stowed rest position to the locked end position in the area of the roof-side holders 8.

The invention claimed is:
1. A restraint device for a vehicle interior having a flexible planar structure that is movably mounted between a rest position stowed in an area of a vehicle-fixed supporting structure and a function position extended approximately vertically towards a roof area and that is provided at an end area in front in an extension direction with a dimensionally stable pulling-out section, and having at least one roof-side holder in which the pulling-out section is detachably fixed by at least one complementary securing section in the function position of the planar structure, wherein the at least one roof-side holder comprises a receptacle and a locking pawl arrangement which is mechanically matched to a movement distance of the at least one securing section during a transfer from the rest position to the function position, wherein the securing section during an upward travel thereof presses the locking pawl arrangement into a release position, the securing section enters the receptacle and the locking pawl arrangement automatically moves back into a locking position as the securing section enters the receptacle, and wherein the locking pawl arrangement is assigned a sensor unit which detects a contact of the securing section of the pulling-out section on the locking pawl arrangement in a locked securing position of the pulling-out section and which is connected to a control unit for operating the locking pawl arrangement for an unlocking operation.

2. The restraint device according to claim 1, wherein two roof-side holders are provided spaced apart from one another in a vehicle transverse direction and each receive one of the at least one complementary securing section of the pulling-out section.

3. The restraint device according to claim 1, wherein a lifting mechanism is provided which is assigned a drive unit for moving the lifting mechanism upwards out of a lower parked position in an area of the supporting structure.

4. The restraint device according to claim 3, wherein the lifting mechanism comprises at least one lifting arm arrangement and one lifting section supported by the lifting arm arrangement and comprising drivers to pick up and lift the pulling-out section.

5. The restraint device according to claim 1, further including a release for releasing the locking position of the locking pawl arrangement.

6. The restraint device according to claim 1, wherein the locking pawl arrangement is assigned a drive element for transferring the locking pawl arrangement from the locking position to the release position, the drive element being actuated by the control unit.

7. The restraint device according to claim 3, wherein the control unit is connected to the drive unit for the lifting mechanism in order to lift the lifting mechanism out of the parked position and move the lifting mechanism upwards.

8. The restraint device according to claim 3, wherein the lifting mechanism is mounted on the supporting structure and a sensor connected to the control unit detects a vehicle-fixed operating position of the supporting structure.

9. The restraint device according to claim 8, wherein the control unit operates the drive unit for the lifting mechanism depending on recorded signals of the sensor relating to an operating position of the supporting structure.

10. A restraint device for a vehicle interior comprising:
   a divider having a flexible planar structure and a rigid pulling section, the flexible planar structure being movably mounted between a rest position stowed in an area of a vehicle-fixed supporting structure and a function position extended approximately vertically towards a roof area, the rigid pulling section being connected to the flexible planar structure at an end area of the flexible planar structure in front in an extension direction; and
   at least one roof-side holder for releasably holding at least one complementary securing section of the divider when the divider is in the function position;
   the at least one roof-side holder comprises a stationary receptacle and a locking pawl separate from the stationary receptacle, the locking pawl moving with the at least one complementary securing section during a transfer of the flexible planar structure from the rest position to the function position;
   wherein the at least one complementary securing section during an upward travel thereof presses the locking pawl into a release position; and
   wherein the at least one complementary securing section enters the stationary receptacle and the locking pawl automatically moves back into a locking position as soon as the at least one complementary securing section has entered the stationary receptacle.

11. The restraint device according to claim 10, wherein the stationary receptacle remains stationary while the locking pawl moves between the release position and the locking position.

12. The restraint device according to claim 10, wherein the stationary receptacle and the locking pawl move relative to each other.

13. The restraint device according to claim 10, further including a sensor unit that detects a contact of the at least one complementary securing section of the rigid pulling section with the locking pawl in a locked securing position of the rigid pulling section and that is connected to a control unit for moving the locking pawl to an unlocked position.

14. The restraint device according to claim 10, further including a spring biasing the locking pawl into the locking position.

15. The restraint device according to claim 1, wherein the receptacle is stationary and separate from the locking pawl arrangement.

16. The restraint device according to claim 1, wherein the receptacle remains stationary while the locking pawl arrangement moves between the release position and the locking position.

17. The restraint device according to claim 1, wherein the receptacle and the locking pawl arrangement move relative to each other.

18. The restraint device according to claim 1, further including a mechanical spring arrangement that automatically moves the locking pawl arrangement into the locking position.

* * * * *